US011797985B2

(12) United States Patent
Chen et al.

(10) Patent No.: US 11,797,985 B2
(45) Date of Patent: Oct. 24, 2023

(54) VALUE TRANSFER METHOD, APPARATUS, AND SYSTEM

(71) Applicant: TENCENT TECHNOLOGY (SHENZHEN) COMPANY LIMITED, Guangdong (CN)

(72) Inventors: Ning Guo Chen, Shenzhen (CN); Jian Wei Deng, Shenzhen (CN); An Qun Pan, Shenzhen (CN); Qiang Fei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 490 days.

(21) Appl. No.: 17/077,051

(22) Filed: Oct. 22, 2020

(65) Prior Publication Data

US 2021/0042740 A1     Feb. 11, 2021

Related U.S. Application Data

(63) Continuation of application No. PCT/CN2019/111914, filed on Oct. 18, 2019.

(30) Foreign Application Priority Data

Oct. 25, 2018 (CN) .......................... 201811250024.7

(51) Int. Cl.
*G06Q 20/38* (2012.01)
*G06Q 20/40* (2012.01)
(Continued)

(52) U.S. Cl.
CPC ........... *G06Q 20/389* (2013.01); *G06Q 10/10* (2013.01); *G06Q 20/3825* (2013.01);
(Continued)

(58) Field of Classification Search
CPC ............. G06Q 20/389; G06Q 20/3825; G06Q 20/3829; G06Q 20/401; G06Q 10/10;
(Continued)

(56) References Cited

U.S. PATENT DOCUMENTS

2018/0240112 A1    8/2018 Castinado et al.
2020/0074459 A1*   3/2020 Ma ..................... G06Q 20/3829
(Continued)

FOREIGN PATENT DOCUMENTS

CN          106548330 A         3/2017
CN          106549749 A         3/2017
(Continued)

OTHER PUBLICATIONS

Extended European Search Report dated Nov. 17, 2021 in European Application No. 19875662.9.
(Continued)

*Primary Examiner* — Courtney P Jones
(74) *Attorney, Agent, or Firm* — Sughrue Mion, PLLC (57) ABSTRACT

The disclosure relates to a value transfer method, apparatus, and system, applied to the field of Internet technologies. The value transfer method includes: in response to receiving a value transfer request of a transaction initiator, generating an incomplete data set corresponding to each of transaction participants on each of transaction nodes, the incomplete data set including an encrypted account value of a corresponding transaction participant before and after a value transfer; merging incomplete data sets corresponding to the transaction participants to obtain a complete data set; requesting a third-party node to perform integrity verification on the complete data set, to obtain an account data set endorsed by a third party; and performing, based on a consensus reached on the account data set between blockchain nodes in a blockchain network, local ledger writing on
(Continued)

the blockchain nodes according to the account data set on which the consensus is reached.

20 Claims, 7 Drawing Sheets (51) Int. Cl.
    *G06Q 10/10*     (2023.01)
    *G06Q 40/04*     (2012.01)
    *H04L 9/00*     (2022.01)
    *H04L 9/06*     (2006.01)

(52) U.S. Cl.
    CPC ....... *G06Q 20/3829* (2013.01); *G06Q 20/401* (2013.01); *G06Q 40/04* (2013.01); *H04L 9/008* (2013.01); *G06Q 2220/00* (2013.01); *H04L 9/0637* (2013.01); *H04L 9/50* (2022.05)

(58) Field of Classification Search
    CPC .... G06Q 40/04; G06Q 2220/00; H04L 9/008; H04L 9/50
    USPC .......................................................... 705/71
    See application file for complete search history.

(56) References Cited

U.S. PATENT DOCUMENTS

2020/0374135 A1* 11/2020 Lu ......................... H04L 9/3263
2020/0389292 A1* 12/2020 Bartolucci ............ H04L 9/3066

FOREIGN PATENT DOCUMENTS

| CN | 108171494 A | 6/2018 | |
|---|---|---|---|
| CN | 108241979 A | 7/2018 | |
| CN | 108520412 A | 9/2018 | |
| CN | 110197433 A | 9/2019 | |
| CN | 106549749 B | 12/2019 | |
| WO | 2018/076762 A1 | 5/2018 | |
| WO | WO-2018076762 A1 * | 5/2018 | ........... G06Q 20/065 |

OTHER PUBLICATIONS

Translation of the Written Opinion of the International Searching Authority dated Jan. 21, 2020 in International Application No. PCT/CN2019/111914.
International Search Report of PCT/CN2019/111914 dated Jan. 21, 2020 [PCT/ISA/210].
Written Opinion of PCT/CN2019/111914 dated Jan. 21, 2020 [PCT/ISA/237].

* cited by examiner

VALUE TRANSFER METHOD, APPARATUS, AND SYSTEM

CROSS-REFERENCE TO RELATED APPLICATION(S)

This application is a bypass continuation application of International Application No. PCT/CN2019/111914, filed on Oct. 18, 2019, which claims priority to Chinese Patent Application No. 201811250024.7, entitled "VALUE TRANSFER METHOD, APPARATUS, AND SYSTEM" filed with the National Intellectual Property Administration, PRC on Oct. 25, 2018, the disclosures of which are herein incorporated by reference in their entireties.

FIELD

The disclosure relates to the field of Internet technologies, and in particular, to a value transfer method, apparatus, and system.

BACKGROUND

With the development of Internet technologies, users can transfer values by using Internet without leaving home. For example, a specific amount in an account A may be transferred to an account B by using Internet technologies.

In a value transfer process implemented based on a blockchain network, the foregoing example is used for illustration. When a transfer request initiated by the account A to the account B is received, the specific amount in the account A is transferred to the account B according to the transfer request, and the transaction is recorded through blockchain nodes in the blockchain network.

However, either in the account A or the account B, an amount in an account exists in a form of plain text. In an actual application scenario, a transaction participant may have requirements for data privacy, that is, expect that an amount in an account cannot be viewed by anyone else. Therefore, there is an urgent need to solve the problem of transferring a value based on a blockchain network while ensuring data privacy.

SUMMARY

To solve the technical problem of insufficient privacy of a value transfer in the related art, embodiments of the disclosure provide a value transfer method, apparatus, and system.

According to an aspect of an example embodiment, provided is a method of transferring a value in a blockchain network, executed by a server device, the method including: in response to receiving a value transfer request of a transaction initiator, generating an incomplete data set corresponding to each of transaction participants on each of transaction nodes, the incomplete data set including an encrypted account value of a corresponding transaction participant before and after a value transfer, the transaction participants including the transaction initiator and at least one transaction recipient; merging incomplete data sets corresponding to the transaction participants to obtain a complete data set, the complete data set including encrypted account values of the transaction participants before and after the value transfer; requesting a third-party node to perform integrity verification on the complete data set, to obtain an account data set endorsed by a third party; and performing, based on a consensus reached on the account data set between blockchain nodes in a blockchain network, local ledger writing on the blockchain nodes according to the account data set on which the consensus is reached.

According to an aspect of an example embodiment, provided is an apparatus for transferring a value in a blockchain network, the apparatus including: at least one memory configured to store program code; and at least one processor configured to read the program code and operate as instructed by the program code, the program code including: data set generation code configured to cause at least one of the at least one processor to, in response to receiving a value transfer request of a transaction initiator, generate an incomplete data set corresponding to each of transaction participants on each of transaction nodes, the incomplete data set including an encrypted account value of a corresponding transaction participant before and after a value transfer, the transaction participants including the transaction initiator and at least one transaction recipient; data set merging code configured to cause at least one of the at least one processor to merge incomplete data sets corresponding to the transaction participants to obtain a complete data set, the complete data set including encrypted account values of the transaction participants before and after the value transfer; data set endorsement code configured to cause at least one of the at least one processor to request a third-party node to perform integrity verification on the complete data set, to obtain an account data set endorsed by a third party; and ledger writing code configured to cause at least one of the at least one processor to perform, based on a consensus reached on the account data set between blockchain nodes in a blockchain network, local ledger writing on the blockchain nodes according to the account data set on which the consensus is reached.

According to an aspect of an example embodiment, provided is a system for transferring a value in a blockchain network, the system including: clients of transaction participants in the blockchain network, the clients of the transaction participants including a client of a transaction initiator and a client of a transaction recipient; blockchain nodes in the blockchain network, the blockchain nodes including a request processing node, transaction nodes, a third-party node, and a consensus node, the client of the transaction initiator being configured to initiate a value transfer request; the request processing node being configured to receive the value transfer request of the transaction initiator and notify the transaction nodes to generate incomplete data sets corresponding to the transaction participants, each of the incomplete data sets including an encrypted account value of a corresponding transaction participant before and after a value transfer; the request processing node being configured to merge the incomplete data sets corresponding to the transaction participants to obtain a complete data set, the complete data set including encrypted account values of the transaction participants before and after the value transfer; the third-party node being configured to perform integrity verification on the complete data set, to obtain an account data set endorsed by a third party; the consensus node being configured to notify, based on a consensus reached on the account data set between the blockchain nodes in the blockchain network, the blockchain nodes to perform local ledger writing according to the account data set on which the consensus is reached; and the request processing node being configured to transmit, based on completion of the local ledger writing, a value transfer result to the clients of the transaction participants.

According to an aspect of an example embodiment, provided is a server device, including: a processor; and a memory configured to store computer-readable instructions, the computer-readable instructions, when executed by the processor, implementing the foregoing method.

According to an aspect of an example embodiment, provided is a non-transitory computer-readable storage medium storing a computer program, the computer program, when executed by a processor, implementing the foregoing method.

BRIEF DESCRIPTION OF THE DRAWINGS

The accompanying drawings, which are incorporated herein and constitute a part of this specification, illustrate example embodiments consistent with the disclosure and, together with the specification, serve to explain the principles of the disclosure. The above and other aspects, features, and advantages of example embodiments of the disclosure will be more apparent from the following description taken in conjunction with the accompanying drawings.

DETAILED DESCRIPTION

Example embodiments are described in detail herein, with reference to the accompanying drawings. When the following descriptions relate to the accompanying drawings, unless otherwise indicated, same reference numbers in different accompanying drawings represent same or similar elements. The implementations described in the following example embodiments do not represent all possible implementations that are consistent with the disclosure. Rather, the implementations described herein are merely examples of apparatuses and methods consistent with those are described in detail in the appended claims and some aspects of the disclosure, and various modifications may be made.

Figure 1:
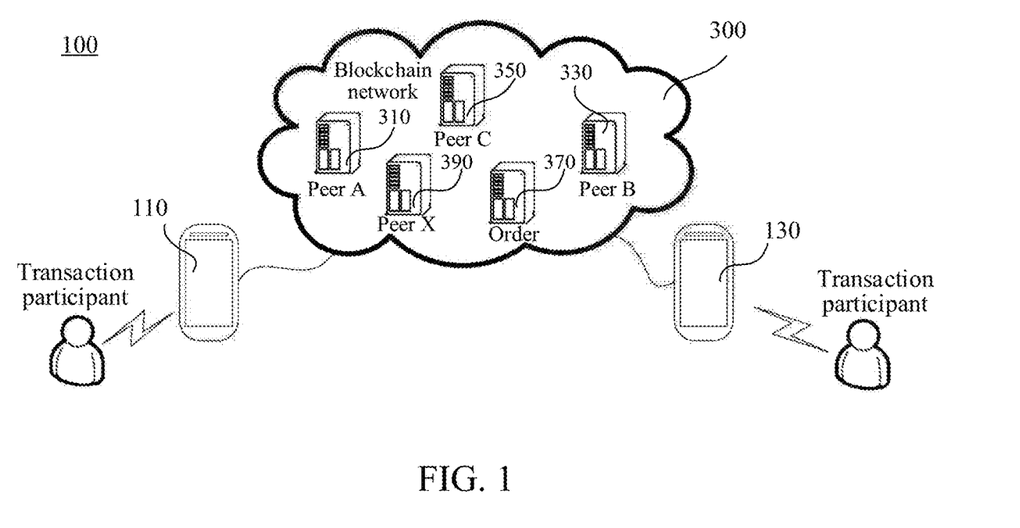
FIG. 1 is a schematic diagram of an implementation environment according to the disclosure.

FIG. 1 is a schematic diagram of an implementation environment related to a value transfer method according to an example embodiment. The implementation environment includes a value transfer system 100. The value transfer system 100 includes terminals 110 and 130 held by users (or transaction participants), and blockchain nodes in a blockchain network 300. The blockchain nodes include transaction nodes Peer A and Peer B, a request processing node Peer X, a third-party node Peer C, and a consensus node Order.

The terminals 110 and 130 held by the users may be used for running clients, and may be desktop computers, laptop computers, tablet computers, smartphones, palmtop computers, personal digital assistants, or the like. The terminals in the disclosure are not limited herein.

The client refers to a client that provides a value transfer function, and for example, may be a payment client, an instant messaging client, a shopping client, a taxi-hailing client, or the like. The client may be in a form of an application program or a web page. Correspondingly, a user interface displayed by the client to users may be in a form of a program window or a web page. The client in the disclosure is not limited herein.

Further, the terminal 110 held by a user refers to a terminal held by a transaction initiator, and the terminal 130 held by a user refers to a terminal held by a transaction recipient. A value transfer process is a process of transferring a specified value in an account of the transaction initiator to an account of the transaction recipient. Therefore, both the transaction initiator and the transaction recipient participate in the value transfer process, and therefore, may be both considered as transaction participants.

The account may include, for example but not limited to, an online banking account, a WeChat change account, a game account, and the like. A value in an account may refer to an amount of physical currency, or may refer to an amount of a virtual currency (for example, game currency), a coupon, or the like.

The blockchain network 300 may include a plurality of server devices in the implementation environment according to an example embodiment. The server devices are blockchain nodes configured for the value transfer system 100 to perform a value transfer process. In other words, the blockchain nodes configured to perform the value transfer process are deployed on the server devices.

According to requirements of an embodiment, the blockchain nodes configured to perform the value transfer process are not limited to being independently deployed on a plurality of server devices, and may be deployed on the same server device. This is not limited specifically in the embodiments of the disclosure.

In the value transfer process, roles assumed by the blockchain nodes include: request processing, endorsement, consensus, bookkeeping, and the like. It would be understood that in different value transfer processes, the same blockchain node may assume different roles.

For ease of description, in the embodiments of the disclosure, the blockchain nodes are defined as follows based on the roles assumed by the blockchain nodes in the value transfer process.

Specifically, the transaction nodes Peer A and Peer B are respectively deployed on server devices 310 and 330, and respectively interact with the terminals 110 and 130 held by the users, to provide the transaction participants with a blockchain network-based value transfer service through execution of a smart contract. In other words, the transaction nodes generate corresponding incomplete data sets for the transaction participants, and record a value transfer event in the value transfer process through the blockchain network, that is, also assume the role of "bookkeeping".

The request processing node Peer X is deployed on a server device 390, and is configured to process a value transfer request of the transaction initiator, that is, merge incomplete data sets corresponding to the transaction participants, and notify the transaction participants of a value transfer result of the value transfer process when the transaction is completed.

The third-party node Peer C is deployed on a server device 350 and is configured to provide the users with an endorsement service in the value transfer process. In other words, in the blockchain network 300, blockchain nodes other than the transaction nodes Peer A and Peer B may all be considered as a "third party" relative to the transaction nodes Peer A and Peer B. The third-party node Peer C may be further configured to record a value transfer event in the value transfer process, that is, assume the role of "bookkeeping" as well.

The consensus node Order is configured to provide the users with a blockchain node consensus service in the value transfer process, and is deployed on a server device 370.

There may be other blockchain nodes in the blockchain network 300, the other blockchain nodes being mainly configured to record the value transfer event in the value transfer process, that is, to assume the role of "bookkeeping".

A network connection is established in advance in a wireless or wired manner between the terminals 110 and 130 held by the users and the blockchain nodes in the blockchain network 300, and between the blockchain nodes in the blockchain network 300, to implement data transmission between each other through the network connection. For example, transmitted data includes, but is not limited to: a value transfer request, incomplete data sets, a complete data set, an account data set, a value transfer result, and the like.

When the client is run on the terminal 110 held by the user, the transaction initiator may initiate the value transfer request for the transaction recipient through the client that is run, to transfer a specified value from the account of the transaction initiator to the account of the transaction recipient according to the request.

Figure 7:
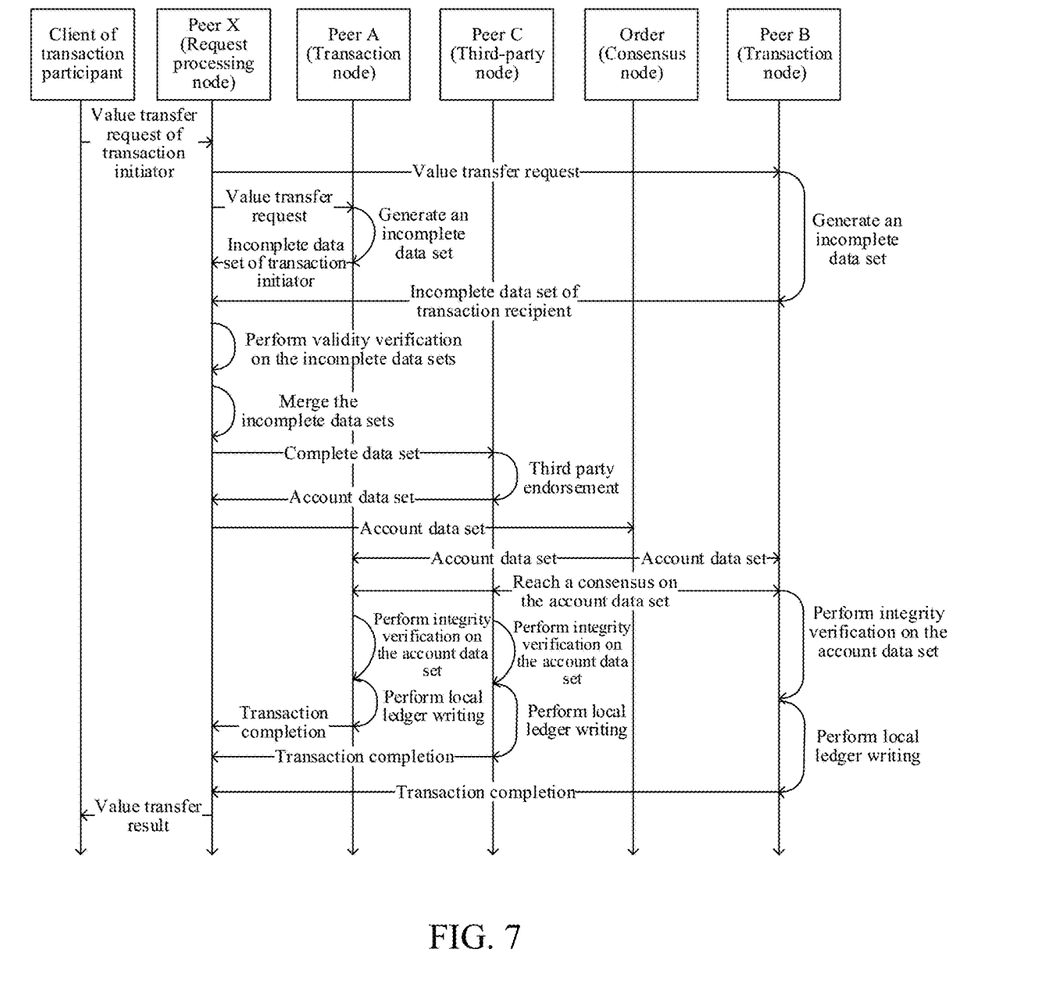
FIG. 7 is a specific timing sequence diagram of a value transfer method in an application scenario.

As shown in FIG. 7, when the transaction initiator initiates the value transfer request, the blockchain nodes in the blockchain network may perform the value transfer process for the transaction participants, thereby implementing a decentralized, non-tamperable distributed ledger technology.

Figure 2:
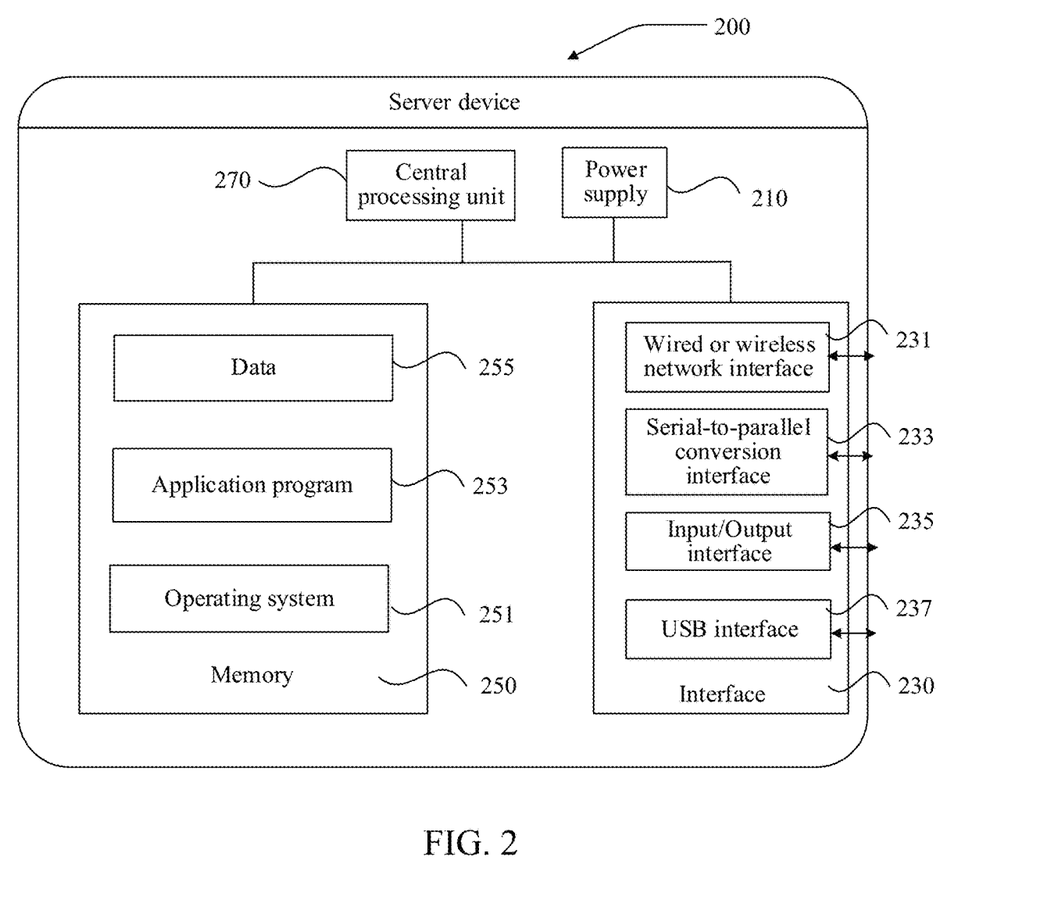
FIG. 2 is a block diagram of a hardware structure of a server device according to an example embodiment.

FIG. 2 is a block diagram of a hardware structure of a server device according to an example embodiment. A server device 200 shown in FIG. 2 is applicable to the blockchain nodes in the blockchain network in the implementation environment shown in FIG. 1.

The server device 200 is merely an example adapted to the disclosure, and should not be considered as any limitation to a use range of the disclosure. The server device 200 should not be understood as being limited to the configuration shown in FIG. 2.

The hardware structure of the server device 200 may vary greatly because of differences in configuration or performance. According to an example embodiment, as shown in FIG. 2, the server device 200 includes: a power supply 210, an interface 230, at least one memory 250, and at least one central processing unit (CPU) 270.

The power supply 210 is configured to provide a working voltage (or power) for hardware devices on the server device 200.

The interface 230 includes at least one wired or wireless network interface 231, at least one serial-to-parallel conversion interface 233, at least one input/output interface 235, at least one USB interface 237, and the like, and is configured to communicate with an external device.

The memory 250, as a resource storage carrier, may be a read-only memory, a random access memory, a magnetic disk, or an optical disk. The resources stored on the memory 250 includes an operating system 251, an application program 253, and data 255, and a storage manner may be short-term storage or permanent storage. The operating system 251 is configured to manage and control various hardware devices and the application program 253 on the server device 200, to implement the computation and processing of the massive data 255 by the CPU 270. The operating system may be Windows Server™, Mac OS X™, Unix™, Linux™, FreeBSD™, or the like. The application program 253 is a computer program that completes at least one specific task based on the operating system 251, and may include at least one module (not shown in FIG. 2), and each module may separately include a series of computer-readable instructions to the server device 200. The data 255 may be a photo, a picture, and the like stored in the magnetic disk.

The CPU 270 may include one or more processors, and is configured to communicate with the memory 250 through a bus, and to operate and process the massive data 255 in the memory 250.

As described in detail above, the server device 200 applicable to the disclosure completes the value transfer method based on reading of a series of computer-readable instructions stored in the memory 250 by the CPU 270.

In addition, the disclosure may further be implemented by a hardware circuit or a hardware circuit in combination with software. Therefore, implementation of the disclosure is not limited to any specific hardware circuit, the software and combinations of the hardware circuit and the software.

Figure 3:
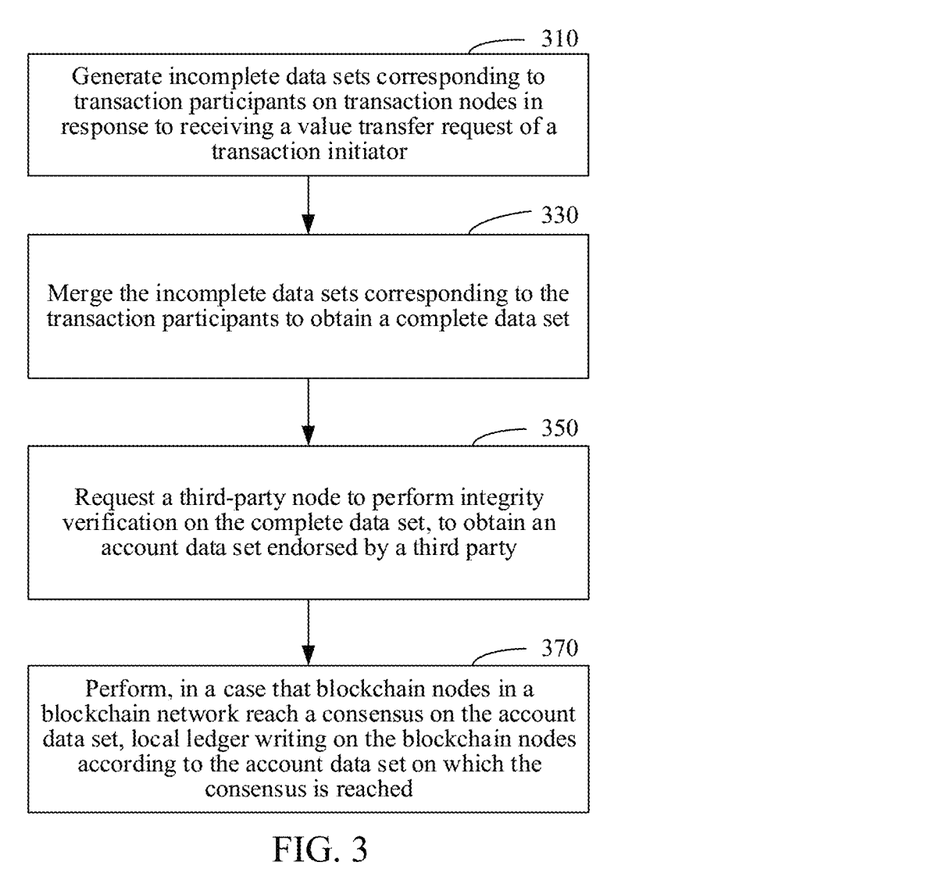
FIG. 3 is a flowchart of a value transfer method according to an example embodiment.

Referring to FIG. 3, in an example embodiment, a value transfer method is applicable to the server device in the implementation environment shown in FIG. 1. An example structure of the server device may be as shown in FIG. 2.

The value transfer method may be executed by the server device.

The value transfer method may include the following operations.

Operation 310: Generate incomplete data sets corresponding to transaction participants on transaction nodes in response to receiving a value transfer request of a transaction initiator.

The value transfer request is used for indicating a specified value that the transaction initiator requests to transfer, that is, indicating that the specified value in the account of the transaction initiator is transferred to the account of the transaction recipient in the value transfer process.

Therefore, the value transfer request includes at least the account of the transaction initiator, the account of the transaction recipient, the specified value requested to be transferred, and the like.

The transaction initiator is not limited to initiating the value transfer request to one transaction recipient, and may alternatively request a plurality of transaction recipients to perform the value transfer. Therefore, the value transfer request may further include a plurality of accounts of transaction recipients. In this case, the transaction participants include at least one transaction initiator and a plurality of transaction recipients in the value transfer process.

The request processing node, after receiving the value transfer request of the transaction initiator, forwards the value transfer request to a transaction node, to enable the transaction node to continue to execute the value transfer process.

It would be understood that in an actual application scenario (or in an embodiment), a transaction participant may have requirements for data privacy, that is, expect that an amount in an account of the transaction participant cannot be viewed by another transaction participant. In other words, each transaction participant may merely learn of a value in his/her own account, and cannot view a value in an account of another transaction participant.

Therefore, each transaction node may obtain, based on the specified value requested to be transferred and an account value of the transaction participant for which each transaction node is configured before the value transfer, an account value of the transaction participant for which each transaction node is configured after the value transfer. In addition, to ensure privacy of the account values of the transaction participants before and after the value transfer, the account values exist in a form of ciphertext in the value transfer process.

Therefore, the incomplete data sets include at least encrypted account values of the transaction participants before and after the value transfer. It would be understood that the incomplete data sets vary with the transaction participants. In other words, each transaction participant for which a blockchain node is configured corresponds to an incomplete data set.

For example, in a value transfer process, transaction participants include a transaction initiator A and a transaction recipient B. A transaction node A1 is configured for the transaction initiator A, and a transaction node B1 is configured for the transaction recipient B.

The following descriptions are provided for a process of generating incomplete data sets corresponding to the transaction participants on the transaction nodes A1 and B1.

For the transaction node A1, the incomplete data set corresponding to the transaction initiator A includes: encrypted account values of the transaction initiator A before and after the value transfer.

For the transaction node B1, the incomplete data set corresponding to the transaction recipient B includes: encrypted account values of the transaction recipient B before and after the value transfer.

Concurrency of value transfers is taken into account, that is, value transfers may be performed on the same account at the same time. For example, an account a transfers an amount to an account b, and meanwhile, an account c transfers an amount to the account a. In this case, for the value in the account a, there may be a read-write conflict (that is, a conflict between a read operation and a write operation that are performed concurrently). Therefore, the incomplete data set may further include: a version number of a value in the account of the transaction participant, to avoid the value in the account of the same transaction participant from a read-write conflict.

The incomplete data set may further include: a signature added by the transaction node to the incomplete data set by using a private key thereof, so that the request processing node that receives the incomplete data set may perform validity verification on the incomplete data set corresponding to the transaction participant by using a public key existing in pair with the private key, that is, the public key of the transaction node. That is, the signature is used for verifying an identity of the transaction node that transmits the incomplete data set.

The incomplete data sets may further include: a transaction identification number, used for uniquely representing the value transfer process.

Operation 330: Merge the incomplete data sets corresponding to the transaction participants to obtain a complete data set.

The complete data set includes encrypted account values of all transaction participants before and after the value transfer.

After the incomplete data sets corresponding to the transaction participants are generated on the transaction nodes, the request processing node may obtain the incomplete data sets corresponding to the transaction participants returned by the transaction nodes, to further obtain the complete data set by merging the incomplete data sets.

Based on the foregoing example for illustration, the incomplete data sets obtained by the request processing node include: the incomplete data set corresponding to the transaction initiator A, and the incomplete data set corresponding to the transaction recipient B.

Therefore, the complete data set obtained through merging includes: encrypted account values of the transaction initiator A before and after the value transfer, and encrypted account values of the transaction recipient B before and after the value transfer.

Further, before the incomplete data sets are merged, validity verification may be further performed on the incomplete data sets corresponding to the transaction participants, to perform verification on identity validity of the transaction nodes that transmit the incomplete data sets.

Specifically, on the transaction node, the incomplete data set is signed according to the private key of the transaction node before the incomplete data set is transmitted to the request processing node, to enable the request processing node to verify the identity of the transaction node.

After receiving the incomplete data set, the request processing node may perform signature verification on the incomplete data set corresponding to the transaction participant according to the public key of the transaction node. If the signature verification succeeds, it indicates that the incomplete data set passes the validity verification. In other words, the validity verification means that the incomplete data set is indeed transmitted by the transaction node, indicating that the identity of the transaction node that transmits the incomplete data set is valid.

The public key and the private key of the transaction node exist in pair, and are generated by using an asymmetric encryption algorithm. Therefore, signature verification may be performed, by using the public key of the transaction node, on the incomplete data set obtained through signature addition by using the private key of the transaction node. The asymmetric encryption algorithm includes, but is not limited to: RSA algorithm, Elgamal algorithm, knapsack algorithm, Rabin-Karp algorithm, D-H algorithm, elliptic curve cryptography (ECC) algorithm, and the like. The disclosure is not specifically limited to these examples.

Through such settings, only when the incomplete data sets corresponding to the transaction participants pass the validity verification, the identities of the transaction nodes that transmit the incomplete data sets are considered valid and the incomplete data sets may be merged, thereby fully guaranteeing validity of data and helping to improve security of the data transfer process.

Operation 350: Request a third-party node to perform integrity verification on the complete data set, to obtain an account data set endorsed by a third party.

To ensure integrity and validity of the value transfer, and to confirm that the value transfer does occur between the transaction initiator and the transaction recipient, integrity verification is performed on the complete data set by using a third-party node in this embodiment.

After the complete data set passes the integrity verification, the complete data set is further signed by the third-party node. The foregoing process is considered as an endorsement action of the third party. In other words, through the endorsement of the third party, the account data set may be considered as a complete data set with integrity.

Operation 370: Perform, in a case that blockchain nodes in a blockchain network reach a consensus on the account data set, local ledger writing on the blockchain nodes according to the account data set on which the consensus is reached.

In this embodiment, the consensus means that the account data set is synchronized to all the blockchain nodes in the blockchain network.

The following describes the consensus process of the account data set.

For the blockchain network, after the consensus node receives the account data set transmitted by the request processing node, the consensus node may forward the account data set to the blockchain nodes. When any blockchain node receives the account data set, the blockchain node transmits an acknowledgment message to other blockchain nodes, and further, when each blockchain node receives a specified quantity of acknowledgment messages, it is considered that the account data set is synchronized to at least the specified quantity of blockchain nodes, and then, the blockchain nodes are triggered to reach a consensus on the account data set.

The specified quantity refers to a quantity of blockchain nodes that are configured to and required for reaching the consensus, and may be flexibly adjusted according to actual requirements of an application scenario. This is not specifically limited in this embodiment.

After the account data set reaches the consensus on the blockchain nodes, the consensus node notifies the blockchain nodes in the blockchain network to perform the local ledger writing according to the account data set on which the consensus is reached.

Specifically, after the account data set reaches the consensus, the account data set on which the consensus is reached exists in all the blockchain nodes in the blockchain network, so that the complete data set may be obtained from the account data set through the signature verification, and further, the complete data set is signed according to private keys of the blockchain nodes, and written to corresponding local ledgers.

As the local ledger writing is completed, that is, the local ledger records the entire value transfer process, the transaction cannot be tampered, thereby implementing the decentralized, non-tamperable distributed ledger technology.

By using the value transfer method, apparatus, and system provided in the disclosure, the technical problem of insufficient privacy of a value transfer in the related art is solved. Through the process described above, data privacy protection is provided in the value transfer process based on the blockchain network. Not only personal rights and interests of the transaction participants are fully guaranteed, but also advantages of decentralization of a blockchain are fully utilized, and there is low complexity or difficulty in technical implementation of the disclosure.

Figure 4:
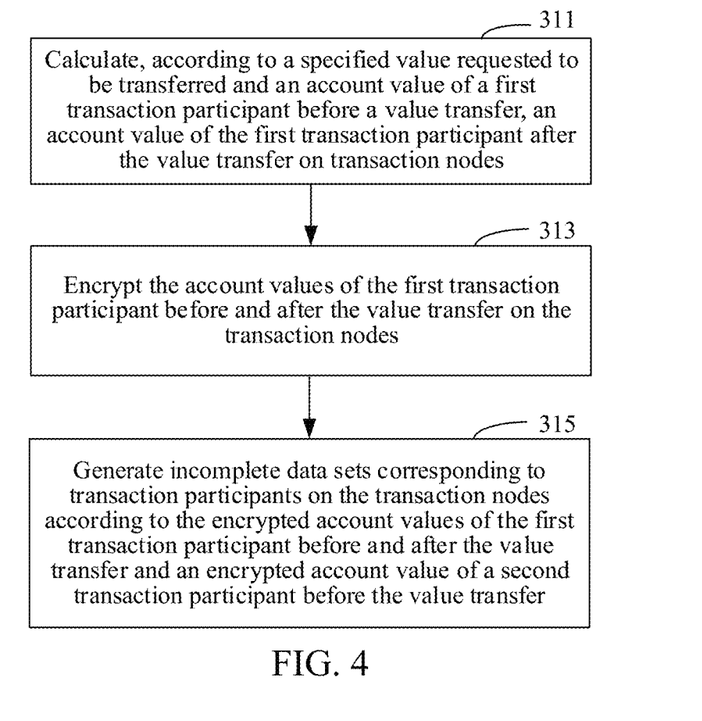
FIG. 4 is a flowchart of operation 310 in the embodiment corresponding to FIG. 3 in an embodiment.

Referring to FIG. 4, in an example embodiment, operation 310 may include the following operations:

Operation 311: Calculate, according to a specified value requested to be transferred and an account value of a first transaction participant before the value transfer, an account value of the first transaction participant after the value transfer on the transaction nodes.

Operation 313: Encrypt the account values of the first transaction participant before and after the value transfer on the transaction nodes.

Operation 315: Generate the incomplete data sets corresponding to the transaction participants on the transaction nodes according to the encrypted account values of the first transaction participant before and after the value transfer and an encrypted account value of a second transaction participant before the value transfer.

The first transaction participant is a transaction participant corresponding to the incomplete data set, and the second transaction participant is a transaction participant other than the first transaction participant in the transaction participants.

As described above, each transaction participant for which a transaction node is configured corresponds to an incomplete data set. In other words, the first transaction participant changes as the transaction node changes.

For example, in a value transfer process, the transaction participants include a transaction initiator A, a transaction recipient B, and a transaction recipient C. A transaction node A1 is configured for the transaction initiator A, a transaction node B1 is configured for the transaction recipient B, and a transaction node C1 is configured for the transaction recipient C.

Therefore, for the transaction node A1, the first transaction participant is the transaction initiator A, and the second transaction participants are the transaction recipient B and the transaction recipient C.

For the transaction node B1, the first transaction participant is the transaction recipient B, and the second transaction participants are the transaction initiator A and the transaction recipient C.

For the transaction node C1, the first transaction participant is the transaction recipient C, and the second transaction participants are the transaction initiator A and the transaction recipient B.

It can be seen from the above that, for a given transaction node, the first transaction participant refers to a transaction participant for which the given transaction node is configured, that is, the transaction participant per se, and the second transaction participant refers to a transaction participant other than the transaction participant for which the given transaction node is configured in the transaction participants.

Further, concurrency of value transfers is taken into account in the value transfer method according to an example embodiment of the disclosure. For example, a plurality of transaction initiators may transfer values to the same transaction recipient. In this case, for an account of the same transaction recipient, there may be a read-write conflict of a value in the account. Therefore, the incomplete data set may further include: the encrypted account value of the second transaction participant before the value transfer.

The reason why an encrypted account value of the second transaction participant after the value transfer is not included in the incomplete data sets is as follows.

Because each transaction participant cannot view values in other transaction participant accounts, that is, the values in other transaction participant accounts also exist in a form of ciphertext, in the value transfer process, each transaction node may merely learn of the encrypted account values of other transaction participants before the value transfer, and cannot calculate account values of the other transaction participants after the value transfer based on the specified value requested to be transferred. Therefore, the encrypted account value of the second transaction participant after the value transfer is not included in the incomplete data sets.

In other words, because the encrypted account value of the second transaction participant after the value transfer cannot be learned of, each transaction node may merely obtain the incomplete data set corresponding to the transaction participant instead of the complete data set.

The following illustrates a process of generating the incomplete data sets corresponding to transaction participants.

It is assumed that, in a value transfer process, the transaction participants include a transaction initiator A (the first transaction participant) and a transaction recipient B (the second transaction participant). A transaction node A1 is configured for the transaction initiator A, and a transaction node B1 is configured for the transaction recipient B.

The transaction node A1 may learn of an account value a1 of the transaction initiator A before the value transfer, and then, may calculate an account value of the transaction initiator A after the value transfer as a1+a=a2 based on a specified value a requested to be transferred and the account value a1 of the transaction participant A before the value transfer.

To meet requirements of the transaction initiator A for data privacy, the account values of the transaction initiator A before and after the value transfer are encrypted, to obtain encrypted account values F(a1) and F(a2) of the transaction participant A before and after the value transfer, where F represents an encryption function.

In addition, in consideration of possible concurrency of value transfers, an encrypted account value F(b1) of the transaction recipient B before the value transfer is further learned of.

Therefore, the incomplete data set corresponding to the transaction initiator A may be represented as:

{TransID Mxxx, sign=sA, Set(A: F(a1), Vx, F(a2); B: F(b1), Vy)}

Similarly, the incomplete data set corresponding to the transaction recipient B may be represented as:

{TransID Mxxx, sign=sB, Set(B: F(b1), Vy, F(b2); A: F(a1), Vx)}

TransID Mxxx indicates that a transaction identification number of this value transfer process is Mxxx.

sign=sA indicates that a signature of the incomplete data set corresponding to the transaction initiator A is sA, and sign=sB indicates that a signature of the incomplete data set corresponding to the transaction recipient B is sB.

Vx represents a version number of a value in an account of the transaction initiator A, and Vy represents a version number of a value in an account of the transaction recipient B.

Based on the configuration of the foregoing embodiment, values in the accounts of the transaction participants may exist in a form of ciphertext, so that data privacy of the transaction participants may be fully protected, a risk of account value exposure is minimized, and personal rights and interests of the transaction participants are fully guaranteed.

Figure 5:
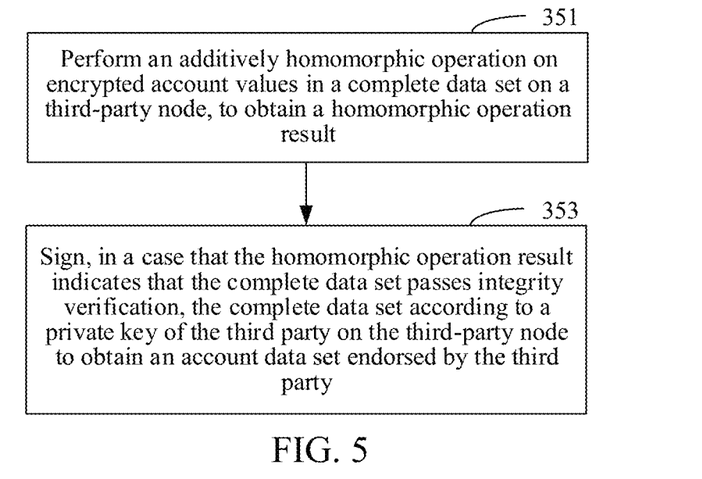
FIG. 5 is a flowchart of operation 350 in the embodiment corresponding to FIG. 3 in an embodiment.

Referring to FIG. 5, in an example embodiment, operation 350 may include the following operations.

Operation 351: Perform an additively homomorphic operation on the encrypted account values in the complete data set on the third-party node, to obtain a homomorphic operation result.

Operation 353: Sign, in a case that the homomorphic operation result indicates that the complete data set passes the integrity verification, the complete data set according to a private key of the third party on the third-party node, to obtain an account data set endorsed by the third party.

The endorsement action of the third party is described by using the foregoing example.

It is assumed that, in a value transfer process, the transaction participants include a transaction initiator A and a transaction recipient B. Correspondingly, a transaction node A1 is configured for the transaction initiator A, and a transaction node B1 is configured for the transaction recipient B.

Further, it is assumed that the complete data set includes at least: Set(A: F(a1), Vx, F(a2); B: F(b1), Vy, F(b2)).

The additively homomorphic operation refers to performing an addition operation directly based on encrypted data. In this embodiment, the encrypted data is encrypted account values in the complete data set.

Specifically, the encrypted account value before the value transfer is F(a1)+F(b1), and the encrypted account value after the value transfer is F(a2)+F(b2).

If F(a1)+F(b1)=F(a2)+F(b2), it may be further calculated according to a homomorphic encryption principle that F(a1+b1)=F(a2+b2), that is, a1+b1=a2+b2, thereby obtaining the homomorphic operation result indicating that the complete data set passes the integrity verification.

When the complete data set passes the integrity verification, the complete data set is signed using the private key of the third party to obtain an account data set endorsed by the third party.

In other words, even when the third party does not learn of specific values of a1, a2, b1, and b2 at all, it may be determined through the indication of the homomorphic operation result that the value transfer does occur between the transaction initiator A and the transaction recipient B, and the value transfer is complete and valid. Further, the endorsement action of the third party is completed, thereby ensuring implementation of the blockchain network-based value transfer process.

Before being transmitted to the third-party node, the complete data set is also signed according to the private key of the request processing node, to enable the third party to perform verification on an identity of the request processing node, that is, perform verification on identity validity of the request processing node that transmits the complete data set.

Therefore, the third-party node needs to perform validity verification on the complete data set, to further perform endorsement after the complete data set passes the integrity verification. The validity verification process on the complete data set may be the same as the validity verification process of the incomplete data sets, and details are not described herein again.

Figure 6:
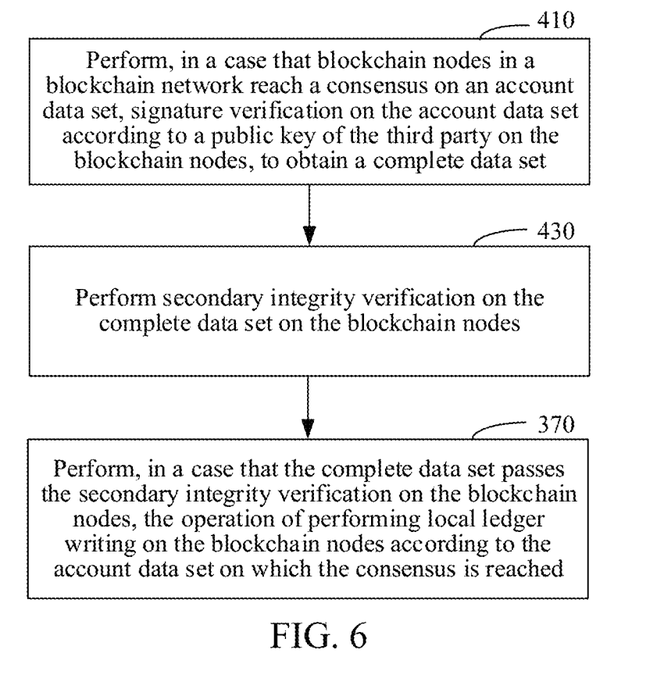
FIG. 6 is a flowchart of another value transfer method according to an example embodiment.

Referring to FIG. 6, in an example embodiment, before operation 370, the method as described above may further include the following operations 410 and 430.

Operation 410: Perform, in a case that the blockchain nodes in the blockchain network reach the consensus on the account data set, a signature verification on the account data set according to a public key of the third party on the blockchain nodes, to obtain the complete data set.

As described above, the account data set may be the complete data set with integrity, and is endorsed by the third party, that is, formed by signing the complete data set with integrity using the private key of the third party.

Because the public key and the private key of the third party exist in pair, and are generated by using an asymmetric encryption algorithm, signature verification may be performed, by using the public key of the third party, on the account data set obtained through signature addition by using the private key of the third party, to obtain the complete data set.

The asymmetric encryption algorithm includes, but is not limited to: the RSA algorithm, the Elgamal algorithm, the knapsack algorithm, the Rabin-Karp algorithm, the D-H algorithm, the ECC algorithm, and the like. The disclosure is not limited to these examples.

Operation 430: Perform a secondary integrity verification on the complete data set on the blockchain nodes.

In this embodiment, the secondary integrity verification is implemented on the blockchain nodes, and may be substantially the same as the integrity verification performed on the complete data set in the endorsement process of the third party, and details are not described herein again.

In a case that the complete data set passes the secondary integrity verification on the blockchain nodes, operation 370 is performed: Perform local ledger writing on the blockchain nodes according to the account data set on which the consensus is reached.

In the above process, the secondary integrity verification of the blockchain nodes on the complete data set is implemented based on integrity pre-verification of the third party on the complete data set, thereby further ensuring security of the value transfer process while ensuring data privacy.

In an example embodiment, the method as described above may further include the following operation:

updating, in a case that the local ledger writing is completed, a contract status of a smart contract followed by the blockchain nodes to transaction completion status on the blockchain nodes in the blockchain network.

All the blockchain nodes in the blockchain network execute the value transfer process by following the smart contract. Therefore, the contract status of the smart contract changes according to the gradual progress of the value transfer.

When the contract status of the smart contract changes according to the transaction completion status, it indicates that the value transfer process is completed, that is, the transaction is completed.

Then, the request processing node may query for the contract status of the smart contract on the blockchain nodes, to learn of a completion progress of the transaction in time. When the contract status of the smart contract is the transaction completion status, the value transfer result is transmitted to the clients of the transaction participants, as shown in FIG. 7, to indicate the transaction participants of the completion progress of the transaction through the value transfer result, that is, whether the specified value in the account of the transaction initiator is successfully transferred to the account of the transaction recipient.

Based on the configuration of the foregoing embodiments, the contract status of the smart contract is updated, to prevent the transaction participants from denying a value transfer event that has been completed, thereby ensuring reliability of the value transfer process.

In addition, all the blockchain nodes execute the value transfer process by following the smart contract, to execute the value transfer process smoothly while completely maintaining data privacy. Moreover, the value transfer process needs no coordination, thereby fully maintaining the advantages of decentralization of the blockchain.

Apparatus embodiments of the disclosure are described below, and may be used for performing the value transfer method of the disclosure. For details not disclosed in the apparatus embodiments of the disclosure, reference may be made to the method embodiments of the value transfer method of the disclosure.

Figure 8:
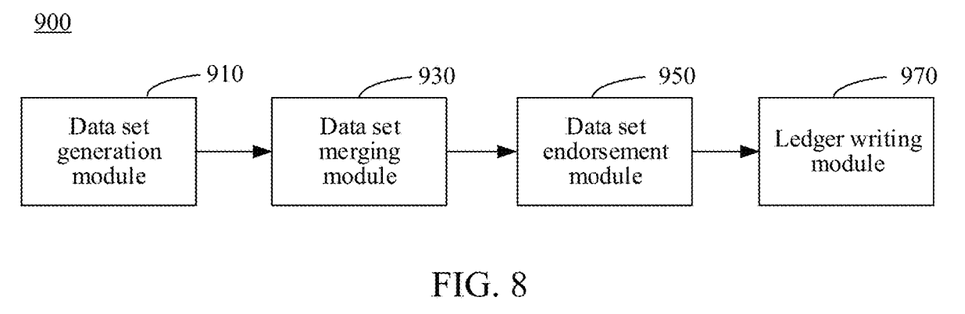
FIG. 8 is a block diagram of a value transfer apparatus according to an example embodiment.

Referring to FIG. 8, in an example embodiment, a value transfer apparatus 900 includes, but not limited to: a data set generation module 910, a data set merging module 930, a data set endorsement module 950, and a ledger writing module 970.

The data set generation module 910 is configured to generate incomplete data sets corresponding to transaction participants on transaction nodes in response to receiving a value transfer request of a transaction initiator, the incomplete data sets including encrypted account values of the corresponding transaction participants before and after a value transfer.

The data set merging module 930 is configured to merge the incomplete data sets corresponding to the transaction participants to obtain a complete data set, the complete data set including encrypted account values of all transaction participants before and after the value transfer.

The data set endorsement module 950 is configured to request a third-party node to perform integrity verification on the complete data set, to obtain an account data set endorsed by a third party.

The ledger writing module 970 is configured to perform, in a case that blockchain nodes in a blockchain network reach a consensus on the account data set, local ledger writing on the blockchain nodes according to the account data set on which the consensus is reached.

Figure 9:
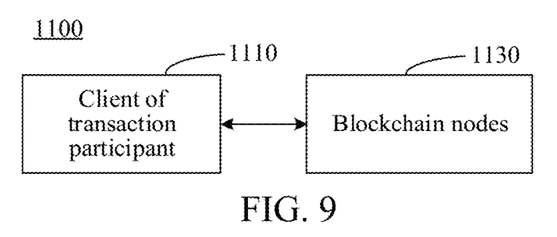
FIG. 9 is a block diagram of a value transfer system according to an example embodiment.

Referring to FIG. 9, in an example embodiment, a value transfer system 1100 is provided. The system 1100 includes clients 1110 of transaction participants and blockchain nodes 1130 in a blockchain network, the clients 1110 of the transaction participants including a client of a transaction initiator and a client of a transaction recipient, and the blockchain nodes 1130 including a request processing node, transaction nodes, a third-party node, and a consensus node.

The client of the transaction initiator is configured to initiate a value transfer request for the transaction initiator.

The request processing node is configured to receive the value transfer request of the transaction initiator and notify the transaction node to generate an incomplete data set corresponding to the transaction participants, the incomplete data set including encrypted account values of the corresponding transaction participants before and after a value transfer.

The request processing node is configured to merge the incomplete data sets corresponding to the transaction participants to obtain a complete data set, the complete data set including encrypted account values of all of transaction participants before and after the value transfer.

The third-party node is configured to perform integrity verification on the complete data set, to obtain an account data set endorsed by a third party.

The consensus node is configured to implement that the blockchain nodes in the blockchain network reach a consensus on the account data set, and notify, in a case that the blockchain nodes in the blockchain network reach the consensus on the account data set, the blockchain nodes to perform local ledger writing according to the account data set on which the consensus is reached.

The request processing node is configured to transmit, in a case that the local ledger writing is completed, a value transfer result to the clients 1110 of the transaction participants, the value transfer result being used for indicating whether a specified value in the account of the transaction initiator is successfully transferred to the account of the transaction recipient.

When the value transfer apparatus and system provided in the foregoing embodiments perform the value transfer, only division of the foregoing functional modules is used as an example for description. In the practical application, the functions may be allocated to and completed by different functional modules according to requirements (or depending on embodiments). That is, an internal structure of the value transfer apparatus and system may be divided into different functional modules, to complete all or some of the functions described above.

In addition, the value transfer apparatus and system provided in the foregoing embodiments and the embodiments of the value transfer method belong to the same concept. Specific operations manners of the modules have been described in detail in the method embodiment, and the details are not described herein again.

Figure 10:
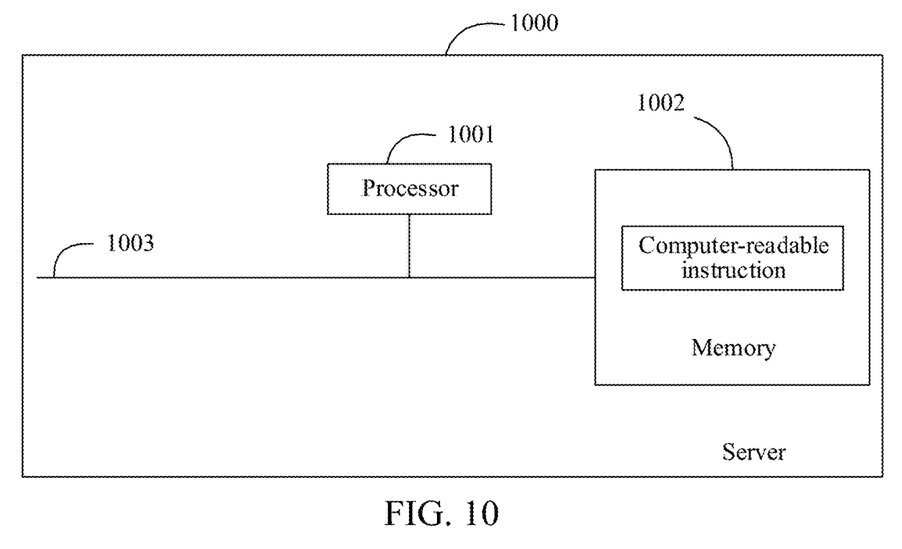
FIG. 10 is a block diagram of a server device according to an example embodiment.

Referring to FIG. 10, in an example embodiment, a server device 1000 is provided, including at least one processor 1001, at least one memory 1002, and at least one communication bus 1003.

The memory 1002 stores computer-readable instructions, and the processor 1001 reads the computer-readable instructions stored in the memory 1002 through the communication bus 1003.

The computer-readable instruction, when executed by the processor 1001, implementing the value transfer method in the foregoing embodiments.

In an example embodiment, a computer-readable storage medium is provided, storing a computer program, the computer program, when executed by a processor, implementing the value transfer method in the foregoing embodiments.

In the foregoing technical solutions, in response to receiving the value transfer request of the transaction initiator on the request processing node, the incomplete data sets corresponding to the transaction participants are generated on the transaction nodes. Then, the incomplete data sets corresponding to the transaction participants are merged by the request processing node to obtain the complete data set, the complete data set including the encrypted account values of all transaction participants before and after the value transfer. Further, the integrity verification is performed by the third-party node on the complete data set, to obtain an account data set endorsed by the third party. When the blockchain nodes in the blockchain network reach the consensus on the account data set, local ledger writing is performed on the blockchain nodes according to the account data set on which the consensus is reached. Therefore, in the entire value transfer process, the account values exist in the form of ciphertext, that is, the encrypted account values. Only the transaction participants themselves learn of the values in their accounts the values in their accounts, and other transaction participants or the third party cannot view the values, thereby fully ensuring the privacy of the value transfer. In addition, the entire value transfer process is based on the blockchain network, thereby still ensuring the advantages of the blockchain decentralization.

A person of ordinary skill in the art would understand that all or some of the operations of the methods in the embodiments may be implemented by a program instructing relevant hardware. The program may be stored in a computer-readable storage medium. The computer-readable storage medium may be a computer-readable storage medium included in the memory in the foregoing embodiments, or may be a computer-readable storage medium that exists alone and is not fitted into a terminal. The computer-readable storage medium stores at least one instruction, at least one program, a code set, or an instruction set, the at least one instruction, the at least one program, the code set or the instruction set being loaded and executed by the processor to implement example embodiments of the methods and apparatus according to the disclosure.

Optionally, the computer-readable storage medium may include: a read-only memory (ROM), a RAM, a solid state drive (SSD), an optical disc, or the like. The RAM may include a resistance RAM (ReRAM) and a dynamic RAM (DRAM). The sequence numbers of the foregoing embodiments of the disclosure are merely for description purpose and do not indicate the preference of the embodiments.

A person of ordinary skill in the art would understand that all or some of the operations of the foregoing embodiments may be implemented by hardware or by a computer program instructing relevant hardware. The program may be stored in a computer-readable storage medium. When the program is executed, the program may include the procedures of the embodiments of the foregoing methods. Any reference to a memory, storage, database or another medium used in the embodiments provided in the disclosure may include a non-volatile and/or volatile memory. The non-volatile memory may include a ROM, a programmable ROM (PROM), an electrically programmable ROM (EPROM), an electrically erasable programmable ROM (EEPROM), or a flash memory. The volatile memory may include a RAM or an external cache. By way of illustration and not limitation, the RAM is available in a variety of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While the disclosure has been particularly shown and described with reference to example embodiments thereof, it will be understood that various changes in form and details may be made therein without departing from the spirit and scope of the following claims.

What is claimed is:

1. A method of transferring a value in a blockchain network, executed by a server device, the method comprising:
   in response to receiving a value transfer request of a transaction initiator to perform a value transfer process, generating an incomplete data set corresponding to each of transaction participants on each of transaction nodes, the incomplete data set comprising man encrypted account value of a corresponding transaction participant before and after a value transfer, (ii) a version number of a value in an account of the corresponding transaction participant, and (iii) a transaction identification number that uniquely identifies the value transfer process, the transaction participants comprising the transaction initiator and at least one transaction recipient, wherein a conflict between a read operation and a write operation that are performed concurrently with respect to the corresponding transaction participant is avoided by using the version number of the value;
   merging incomplete data sets corresponding to the transaction participants to obtain a complete data set, the incomplete data sets of the transaction participants comprising a same transaction identification number, the complete data set comprising encrypted account values of the transaction participants before and after the value transfer;
   requesting a third-party node to perform integrity verification on the complete data set, to obtain an account data set endorsed by a third party; and
   performing, based on a consensus reached on the account data set between blockchain nodes in a blockchain network, local ledger writing on the blockchain nodes according to the account data set on which the consensus is reached.

2. The method according to claim 1, wherein the generating comprises:
   obtaining an account value of a first transaction participant, among the transaction participants, after the value transfer on the transaction nodes, according to a specified value requested to be transferred, indicated by the value transfer request, and an account value of the first transaction participant before the value transfer;
   encrypting account values of the first transaction participant before and after the value transfer on the transaction nodes; and
   generating the incomplete data sets corresponding to the transaction participants on the transaction nodes according to the encrypted account values of the first transaction participant before and after the value transfer and an encrypted account value of a second transaction participant, among the transaction participants other than the first transaction participant, before the value transfer.

3. The method according to claim 1, further comprising, prior to the merging:
   performing validity verification on the incomplete data sets corresponding to the transaction participants according to public keys of the transaction participants, wherein the merging comprises merging the incomplete data sets corresponding to the transaction participants that pass the validity verification to obtain the complete data set.

4. The method according to claim 1, wherein the requesting comprises:
   performing an additively homomorphic operation on the encrypted account values in the complete data set on the third-party node, to obtain a homomorphic operation result; and
   signing, based on the homomorphic operation result indicating that the complete data set passes the integrity verification, the complete data set according to a private key of the third party on the third-party node, to obtain the account data set endorsed by the third party.

5. The method according to claim 1, further comprising, prior to the performing the local ledger writing:
   performing, based on the consensus reached on the account data set between the blockchain nodes in the blockchain network, signature verification on the account data set according to a public key of the third party on the blockchain nodes, to obtain the complete data set;
   performing secondary integrity verification on the complete data set on the blockchain nodes; and
   performing, based on the complete data set passing the secondary integrity verification on the blockchain nodes, the local ledger writing on the blockchain nodes according to the account data set on which the consensus is reached.

6. The method according to claim 1, wherein the method further comprises:
   updating, based on completion of the local ledger writing, a contract status of a smart contract followed by the blockchain nodes to a transaction completion status on the blockchain nodes in the blockchain network.

7. A server device, comprising:
   a processor; and
   a memory configured to store computer-readable instructions, the computer-readable instructions, when executed by the processor, implementing the method according to claim 1.

8. A non-transitory computer-readable storage medium storing a computer program, the computer program, when executed by a processor, implementing the method according to claim 1.

9. An apparatus for transferring a value in a blockchain network, the apparatus comprising:
   at least one memory configured to store program code; and
   at least one processor configured to read the program code and operate as instructed by the program code, the program code comprising:
   data set generation code configured to cause at least one of the at least one processor to, in response to receiving a value transfer request of a transaction initiator to perform a value transfer process, generate an incomplete data set corresponding to each of transaction participants on each of transaction nodes, the incomplete data set comprising man encrypted account value of a corresponding transaction participant before and after a value transfer, (ii) a version number of a value in an account of the corresponding transaction participant, and (iii) a transaction identification number that uniquely identifies the value transfer process, the transaction participants comprising the transaction initiator and at least one transaction recipient, wherein a conflict between a read operation and a write operation that are performed concurrently with respect to the corresponding transaction participant is avoided by using the version number of the value;
   data set merging code configured to cause at least one of the at least one processor to merge incomplete data sets corresponding to the transaction participants to obtain a complete data set, the incomplete data sets of the transaction participants comprising a same transaction identification number, the complete data set comprising encrypted account values of the transaction participants before and after the value transfer;

data set endorsement code configured to cause at least one of the at least one processor to request a third-party node to perform integrity verification on the complete data set, to obtain an account data set endorsed by a third party; and ledger writing code configured to cause at least one of the at least one processor to perform, based on a consensus reached on the account data set between blockchain nodes in a blockchain network, local ledger writing on the blockchain nodes according to the account data set on which the consensus is reached.

10. The apparatus according to claim 9, wherein the data set generation code comprises:

value obtaining code configured to cause at least one of the at least one processor to obtain an account value of a first transaction participant, among the transaction participants, after the value transfer on the transaction nodes, according to a specified value requested to be transferred, indicated by the value transfer request, and an account value of the first transaction participant before the value transfer;

value encryption code configured to cause at least one of the at least one processor to encrypt account values of the first transaction participant before and after the value transfer on the transaction nodes; and incomplete data set generation code configured to cause at least one of the at least one processor to generate incomplete data sets corresponding to the transaction participants on the transaction nodes according to the encrypted account values of the first transaction participant before and after the value transfer and an encrypted account value of a second transaction participant, among the transaction participants other than the first transaction participant, before the value transfer.

11. The apparatus according to claim 9, wherein the program code further comprises:

validity verification code configured to cause at least one of the at least one processor to perform validity verification on the incomplete data sets corresponding to the transaction participants according to public keys of the transaction participants, wherein the data set merging code is configured to cause at least one of the at least one processor to merge the incomplete data sets corresponding to the transaction participants to obtain the complete data set based on the incomplete data sets corresponding to the transaction participants that pass the validity verification.

12. The apparatus according to claim 9, wherein the data set endorsement code comprises:

homomorphic operation code configured to cause at least one of the at least one processor to perform an additively homomorphic operation on the encrypted account values in the complete data set on the third-party node, to obtain a homomorphic operation result; and data set signing code configured to cause at least one of the at least one processor to sign, based on the homomorphic operation result indicating that the complete data set passes the integrity verification, the complete data set according to a private key of the third party on the third-party node, to obtain the account data set endorsed by the third party.

13. The apparatus according to claim 9, wherein the program code further comprises:

data set signature verification code configured to cause at least one of the at least one processor to perform, based on the consensus reached on the account data set between the blockchain nodes in the blockchain network, signature verification on the account data set according to a public key of the third party on the blockchain nodes, to obtain the complete data set; and integrity verification code configured to cause at least one of the at least one processor to perform secondary integrity verification on the complete data set on the blockchain nodes, and wherein the ledger writing code is configured to cause at least one of the at least one processor to perform, based on the complete data set passing the secondary integrity verification on the blockchain nodes the local ledger writing on the blockchain nodes according to the account data set on which the consensus is reached.

14. The apparatus according to claim 9, wherein the program code further comprises:

contract status update code configured to cause at least one of the at least one processor to update, based on completion of the local ledger writing, a contract status of a smart contract followed by the blockchain nodes to a transaction completion status on the blockchain nodes in the blockchain network.

15. A system for transferring a value in a blockchain network, the system comprising:

clients of transaction participants in the blockchain network, the clients of the transaction participants comprising a client of a transaction initiator and a client of a transaction recipient; and blockchain nodes in the blockchain network, the blockchain nodes comprising a request processing node, transaction nodes, a third-party node, and a consensus node, the client of the transaction initiator being configured to initiate a value transfer request to perform a value transfer process, the request processing node being configured to receive the value transfer request of the transaction initiator and notify the transaction nodes to generate incomplete data sets corresponding to the transaction participants, each of the incomplete data sets comprising (i) an encrypted account value of a corresponding transaction participant before and after a value transfer, (ii) a version number of a value in an account of the corresponding transaction participant, and (iii) a transaction identification number that uniquely identifies the value transfer process, wherein a conflict between a read operation and a write operation that are performed concurrently with respect to the corresponding transaction participant is avoided by using the version number of the value, the request processing node being configured to merge the incomplete data sets corresponding to the transaction participants to obtain a complete data set, the incomplete data sets of the transaction participants comprising a same transaction identification number, the complete data set comprising encrypted account values of the transaction participants before and after the value transfer, the third-party node being configured to perform integrity verification on the complete data set, to obtain an account data set endorsed by a third party, the consensus node being configured to notify, based on a consensus reached on the account data set between the blockchain nodes in the blockchain network, the blockchain nodes to perform local ledger writing according to the account data set on which the consensus is reached, and the request processing node being configured to transmit, based on completion of the local ledger writing, a value transfer result to the clients of the transaction participants.

16. The system according to claim 15, wherein the transaction nodes are configured to generate the incomplete data sets by performing:

obtaining an account value of a first transaction participant, among the transaction participants, after the value transfer on the transaction nodes, according to a specified value requested to be transferred, indicated by the value transfer request, and an account value of the first transaction participant before the value transfer;

encrypting account values of the first transaction participant before and after the value transfer on the transaction nodes; and generating the incomplete data sets corresponding to the transaction participants on the transaction nodes according to the encrypted account values of the first transaction participant before and after the value transfer and an encrypted account value of a second transaction participant, among the transaction participants other than the first transaction participant, before the value transfer.

17. The system according to claim 15, wherein the request processing node performs validity verification on the incomplete data sets corresponding to the transaction participants according to public keys of the transaction participants, and merges incomplete data sets corresponding to the transaction participants that pass the validity verification to obtain the complete data set.

18. The system according to claim 15, wherein the third-party node is configured to perform an additively homomorphic operation on the encrypted account values in the complete data set on the third-party node, to obtain a homomorphic operation result, and based on the homomorphic operation result indicating that the complete data set passes the integrity verification, sign the complete data set according to a private key of the third party on the third-party node, to obtain the account data set endorsed by the third party.

19. The system according to claim 15, wherein the request processing node performs, based on the consensus reached on the account data set between the blockchain nodes in the blockchain network, signature verification on the account data set according to a public key of the third party on the blockchain nodes, to obtain the complete data set, wherein the third-party node performs secondary integrity verification on the complete data set on the blockchain nodes, and the blockchain nodes perform, based on the complete data set passing the secondary integrity verification on the blockchain nodes, the local ledger writing on the blockchain nodes according to the account data set on which the consensus is reached.

20. The system according to claim 15, wherein the request processing node is configured to update, based on completion of the local ledger writing, a contract status of a smart contract followed by the blockchain nodes to a transaction completion status on the blockchain nodes in the blockchain network.

* * * * *